United States Patent [19]
Farmer et al.

[11] Patent Number: 5,662,021
[45] Date of Patent: Sep. 2, 1997

[54] CONTROL SYSTEM FOR A MOVEMENT ACTUATOR

[75] Inventors: John E. Farmer; Carl A. Rotenberger, both of St. Petersburg, Fla.

[73] Assignee: Farmer Mold & Machine Works, Inc., St. Petersburg, Fla.

[21] Appl. No.: 603,194

[22] Filed: Feb. 20, 1996

Related U.S. Application Data

[63] Continuation of Ser. No. 299,478, Aug. 31, 1994, abandoned.

[51] Int. Cl.⁶ .......................... F15B 13/16; F15B 15/17
[52] U.S. Cl. .................... 91/361; 91/415; 91/462
[58] Field of Search ............... 91/361, 415, 417 R, 91/417 A, 397, 462, 465, 47, 51, 405; 60/459, 477; 92/13

[56] References Cited

U.S. PATENT DOCUMENTS

| | | | |
|---|---|---|---|
| 2,459,902 | 1/1949 | Tucker | 91/415 X |
| 3,479,924 | 11/1969 | Ferguson | 91/415 |
| 3,604,884 | 9/1971 | Olsson | 91/415 X |
| 3,608,431 | 9/1971 | Pease, III | 91/361 |
| 3,763,744 | 10/1973 | Fournell et al. | 91/417 R X |
| 3,803,842 | 4/1974 | Aoki | 91/415 X |
| 4,505,109 | 3/1985 | Thomsen et al. | 91/417 R X |
| 5,188,015 | 2/1993 | Hageman | 91/417 R X |
| 5,474,138 | 12/1995 | Evarts | 91/397 X |

FOREIGN PATENT DOCUMENTS

| | | | |
|---|---|---|---|
| 213320 | 2/1961 | Australia | 91/415 |

*Primary Examiner*—Hoang Nguyen
*Attorney, Agent, or Firm*—Frijouf, Rust & Pyle P.A.

[57] ABSTRACT

An improved control system for a movement actuator is disclosed for moving a member between a retracted position and an extended position. The movement actuator comprises a cylinder having a piston with a fluid supply providing pressure to a first and a second side of the piston. A control applies a first and a second fluid pressure on the first and second sides of the piston for moving the member from the retracted position toward the extended position with a force related to a difference between the first fluid pressure and second fluid pressure for reducing the possibility of damage to an unintended object in the path of the member. The control applies the first fluid pressure on the first side of the piston upon the member being in proximity to the extended position for moving the member into the extended position with a force related to the first fluid pressure for insuring proper positioning of the member.

17 Claims, 11 Drawing Sheets

CONTROL SYSTEM FOR A MOVEMENT ACTUATOR

This application is a continuation of application Ser. No. 08/299,478 filed Aug. 31, 1994, the disclosure of which is incorporated herein by reference now abandoned.

BACKGROUND OF THE INVENTION

1. Field of the Invention

This invention relates to actuators for moving a member and more particularly to an improved control system for providing a controlled force during the movement of the member for reducing the possibility of damage or injury to an unintended object or person in the path of the member while producing a positive force at the termination of movement for insuring proper positioning of the member.

2. Background of the Invention

The increased competition in manufacturing business has encouraged the increased use of automation in an assembly process. As automation has become faster and more efficient, there has been a corresponding reduction in direct human observation of the manufacturing process. As a result, there exists an increased need for providing automatic machines that are capable of accommodating for unusual situation such as an unintended object in the path of the moving automatic machine.

In most automatic machines, a tool is moved in proximity to a workpiece for enabling the tool to operate upon the workpiece. In some instances, the tool is moved relative to the workpiece whereas in other situations, the workpiece is moved relative to the tool. Typically, the workpiece is aligned relative to the tool prior to the movement of the tool. When the tool is properly aligned relative to the workpiece, the tool is moved into contact with the workpiece and the tool performs the operation on the workpiece. After the operation is performed on the workpiece, the workpiece is moved to another position for further operations.

Most automated machines are incapable of accommodating for unusual situation such as an unintended object in the path of the moving automatic machine. One unusual situation includes the unintended object being a workpiece being misaligned relative to the tool. If the workpiece is misaligned relative to the tool, the tool may cause damage to either the workpiece or the tool thus causing a loss of product or tooling. In addition, the automated process must be terminated in order to repair the damaged workpiece or the tool.

Another and more unpleasant unusual situation includes the unintended object being a worker being caught between the workpiece and the tool. A worker may be severely injured if accidentally caught by the movement of the tool relative to the workpiece. Such an injury is extremely costly to an automated process.

Therefore, it is an object of the present invention to provide an improved actuator for moving a member such as a tool or a workpiece with a controlled force for reducing the possibility of damage or injury to an unintended object or person in the path of the member.

Another object of this invention is to provide an improved actuator for moving a member that produces a positive force at the termination of movement when no unintended object or person are the path of the member.

Another object of this invention is to provide an improved actuator for moving a member that produces a positive force at the termination of movement for insuring proper positioning of the member.

Another object of this invention is to provide an improved actuator for moving a member that may be applied to actuators of various designs as well as previously installed actuators.

Another object of this invention is to provide an improved actuator for moving a member that does not substantially reduce the speed of the actuator.

Another object of this invention is to provide an improved actuator for moving a member that does not substantially increase the cost of the actuator.

Another object of this invention is to provide an improved actuator for moving a member that provides a safer working environment for workers in proximity to the automated machine.

Another object of this invention is to provide an improved actuator for moving a member that reduces the damage to a tool and/or the workpiece in the event of misalignment of the tool relative to the workpiece.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved control system for a movement actuator for moving a member between a retracted position and an extended position. The movement actuator comprises a cylinder with a piston located therein. The piston has a first and a second side with the piston being interposed between a first and a second fluid port in the cylinder. A first and a second conduit respectively interconnects the first and second fluid ports to a fluid supply. The improved control system comprises a first pressure regulator for regulating the flow of fluid through the first conduit with a first fluid pressure. A second pressure regulator regulates the flow of fluid through the second conduit with a second fluid pressure. A first and a second valve are respectively interposed in the first and second fluid conduits for controlling the flow of fluid between the fluid supply and the first and second fluid ports. A sensor senses a predetermined location of the member between the retracted position and the extended position. A control actuates the first and the second valves for respectively applying the first and second fluid pressures on the first and second sides of the piston for moving the member from the retracted position toward the extended position with a force related to a difference between the first fluid pressure and second fluid pressure. The control actuates the first valve for applying the first fluid pressure on the first side of the piston upon the sensor sensing the member being in the predetermined location for moving the member into the extended position with a force related to the first fluid pressure. The movement of the member with a controlled force inhibits damage to either the member or the object in the event of misalignment therebetween.

In a more specific embodiment of the invention, the cylinder and the piston define an air cylinder. The cylinder has a first and a second end with the first and second fluid ports respectively located proximate to the first and second ends. In the alternative, the cylinder and the piston may define a hydraulic cylinder.

In one embodiment of the invention, the member moves in a vertical direction between the retracted and the extended position. The member has a weight providing a vertically downward force. The first and second pressure regulators are selected for establishing the differential fluid pressure to compensate for the vertically downward force of the member in establishing the controlled force.

In another embodiment of the invention, the control actuates the first valve for applying the first fluid pressure on the first side of the piston upon the sensor sensing the position of the member in close proximity to the extended position. The sensor may include a contact point and a probe. The contact base is secured in relation to the object whereas the probe is secured relative to the actuator for movement in unison with the member. The probe contacts the contact point when the member is disposed in the predetermined location. Preferably, one of the probe and the contact point is adjustable for adjusting the predetermined location. The sensor may include the sensor changing an electrical circuit upon the member being disposed in the predetermined location.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
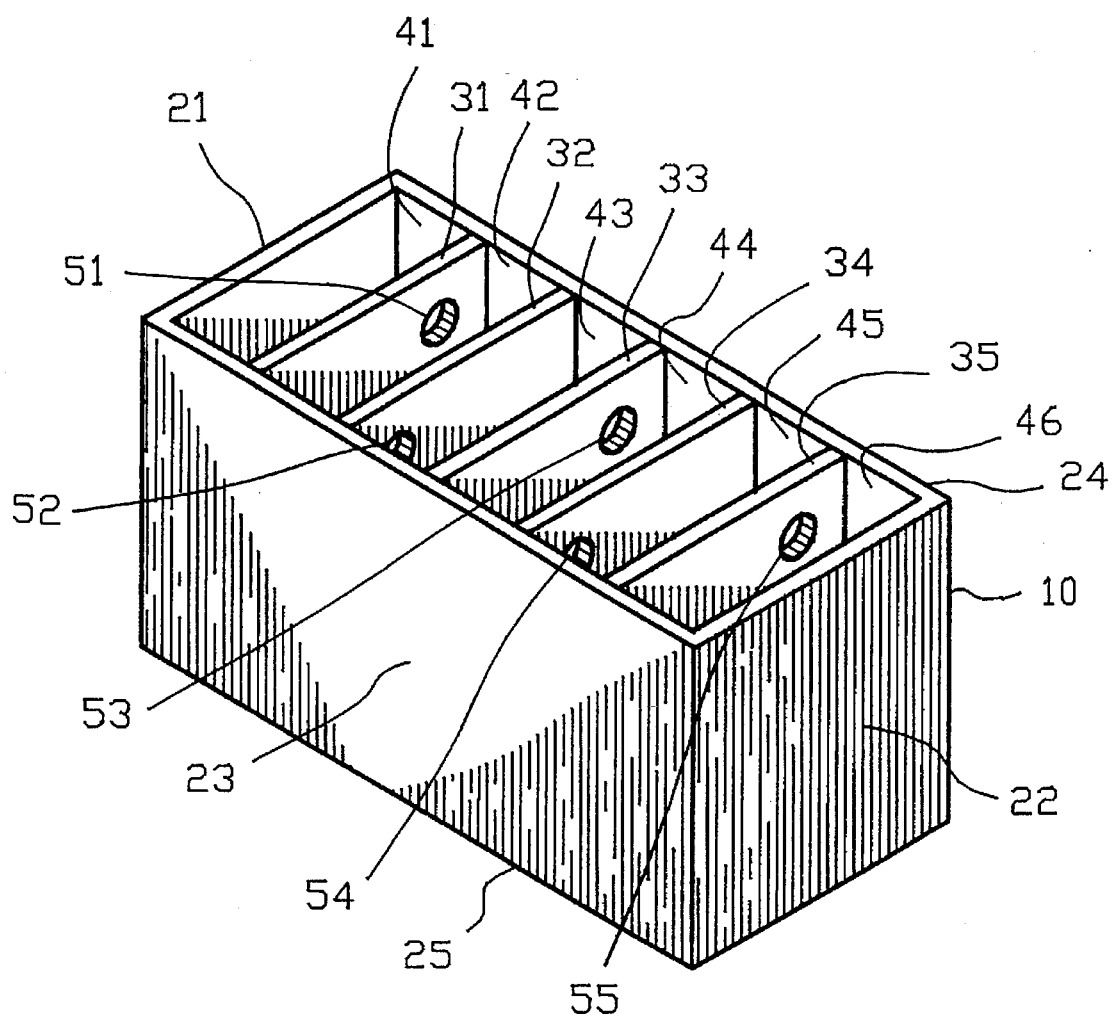
FIG. 1 is an isometric view of an example of an object shown as a workpiece in the form of an open top battery case.

FIG. 1 is an isometric view of an object shown as a workpiece in the form of a battery case 10 during an intermediate stage of a manufacturing process. The battery case 10 is in the shape of an open-topped box, comprising a first through fourth sides 21–24 and a bottom 25. A top (not shown) has not been attached to the battery case 10 thereby allowing an internal view of battery case 10. Typically, the battery case 10 is fabricated from a polymeric material such as polyethylene or the like.

A plurality of intercell partitions 31–35 are disposed in the battery casing 10, parallel to the first and second sides 21 and 22 of the battery case 10, and at such intervals as to create a plurality of cells 41–46. The number of partitions and the number of resulting cells vary depending upon the type of battery being manufactured, with six cells as shown in this illustration. A plurality of holes 51–55 are punched in the plurality of intercell partitions 31–35 respectively. The plurality of holes 51–55 are for the purpose of receiving therein a plurality of electrical connections (not shown) for electrically connecting the plurality of cells 41–46. Although the object has been shown to be a workpiece in the form of a battery case, it should be appreciated by those skilled in the art that the present invention relates to a movement actuator per se, and may be installed in a wide variety of applications including the manufacturing process.

Figure 2:
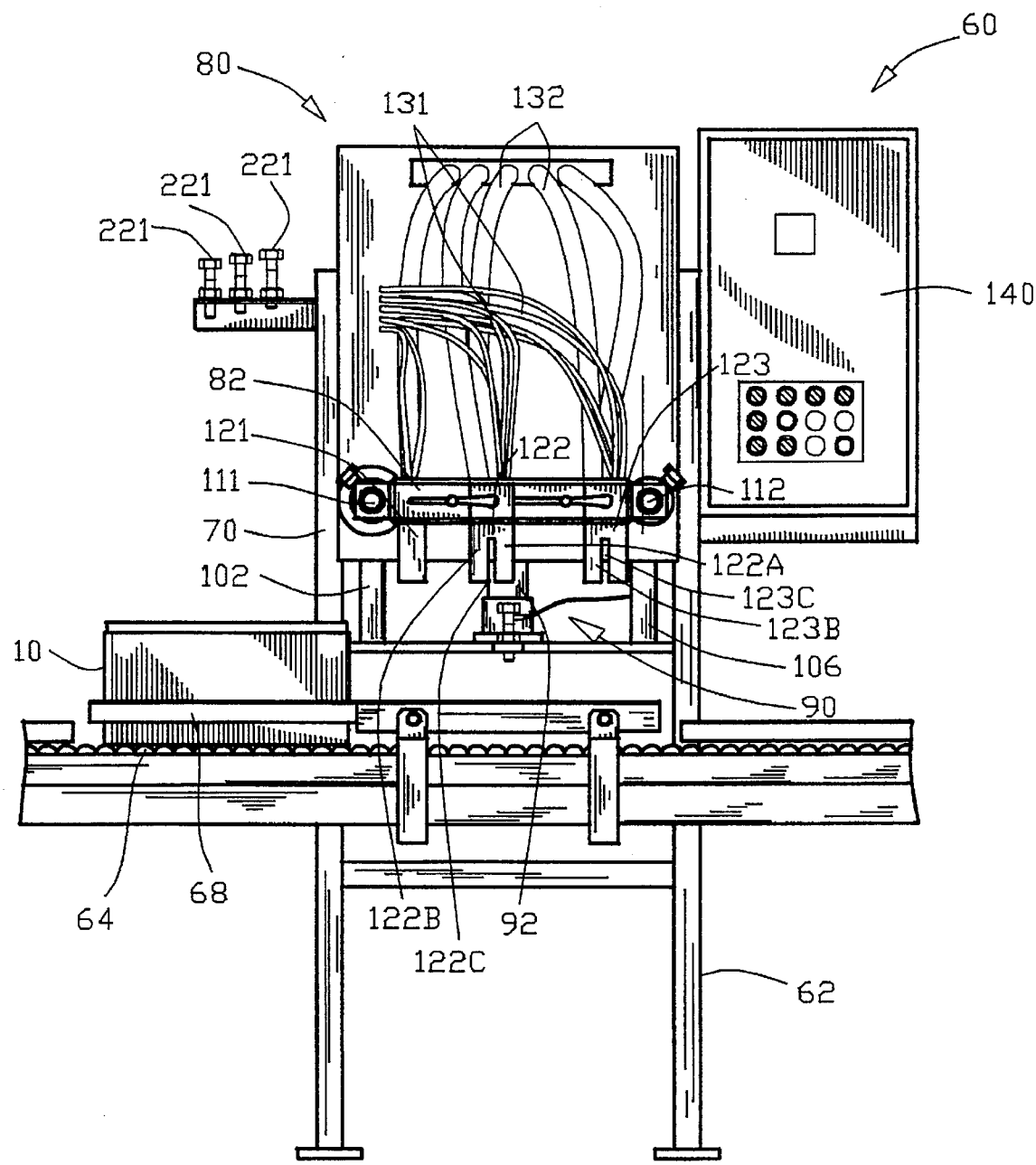
FIG. 2 is a front view of an apparatus incorporating the present invention with a movement actuator in a retracted position.
Figure 3:
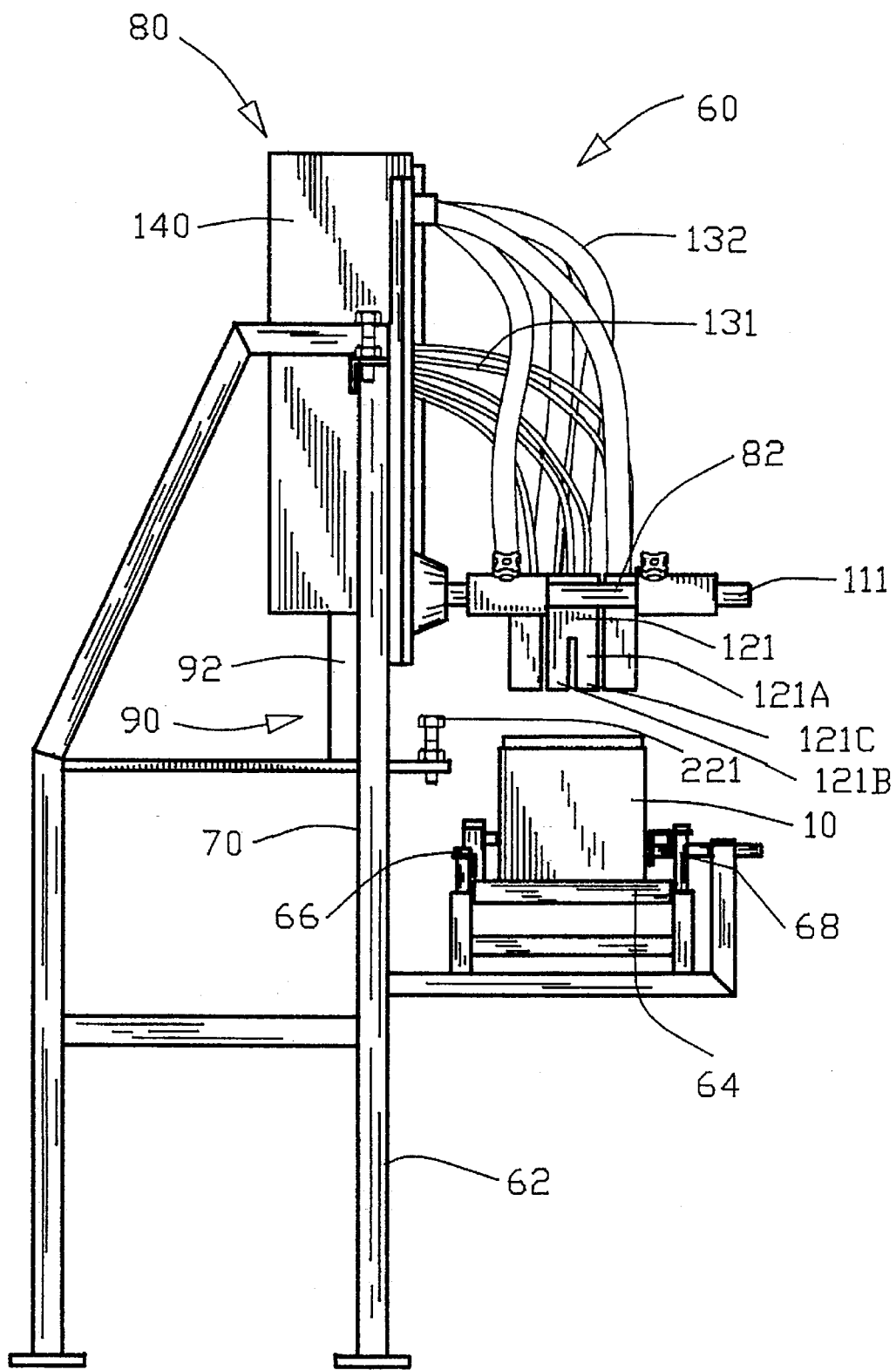
FIG. 3 is a side view of FIG. 2.

FIGS. 2 and 3 are front and side elevational views respectively of an apparatus 60 for punching the plurality of holes 51–55 in all the plurality of intercell battery partitions 31–35 disposed between the plurality of cells 41–46 of the battery case 10. The apparatus 60 comprises a frame 62 supporting conveyor means shown as a conveyor 64 for transporting the battery case 10 to an operating position and for transporting the battery case 10 away from the operating position. The frame 62 also supports a positioning means comprising an electric eye 66 and a side guide 68 for positioning the battery case 10 on the conveyor 64.

An upstanding member 70 extends from frame 62 for supporting a member 80 carrying a tool 82 with a movement actuator 90 shown as a pneumatic cylinder 92 moving the member 80 and tool 82 between a retracted position and an extended position as will be described in greater detail hereinafter.

Figure 4:
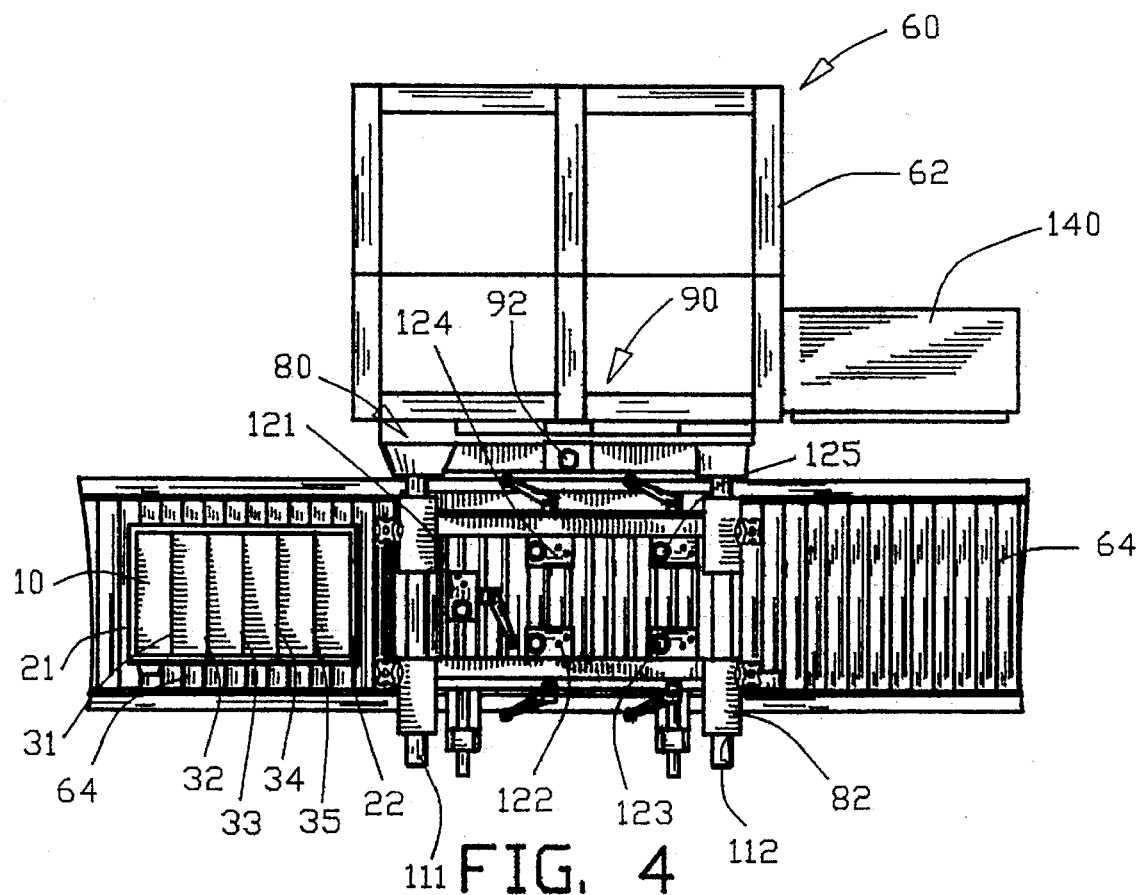
FIG. 4 is a sectional view along line 4—4 in FIG. 2 illustrating an overlay of the a member shown as a tool and the battery case.
Figure 5:
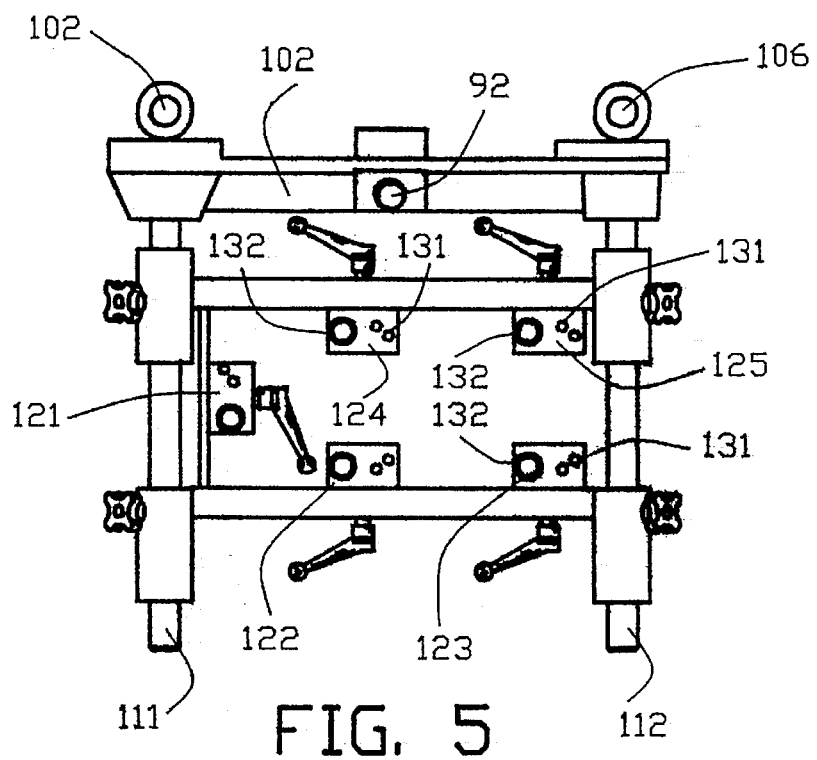
FIG. 5 is an enlarged view of a portion of FIG. 4.

FIG. 4 is a sectional view along line 4—4 in FIG. 2 illustrating the tool 82 positioned over the battery case 10 with FIG. 5 being an enlarged view of a portion of FIG. 4. The movement actuator 90 comprises a platen 102 which is slidably mounted on shafts 104 and 106. The pneumatic cylinder 92 is mounted between the frame 60 and the platen 102 for moving the platen 102 between a retracted position shown in FIGS. 2 and 3 and an extended position shown in FIGS. 6 and 7.

As best shown in FIG. 5, the platen 102 supports plural horizontally extending shafts 111 and 112 for receiving tool frames 114 and 116. The tool frames 114 and 116 adjustably receive a plurality of hole punches 121–125 for punching the plurality of holes 51–55 in all the plurality of intercell battery partitions 31–35. Each of the plurality of hole punches 121–125 includes a pneumatically operated punch 121A–125A cooperating with a respective die 121B–125B for punching the plurality of holes 51–55. Each of the plurality of hole punches 121–125 are separated from the respective dies 121B–125B by slots 121C–125C. A plurality of hoses 131 power the pneumatically operated punch 121A–125A whereas a plurality of hoses 132 remove the punched hole portions from the dies 121B–125B. An electrical control 140 is also mounted on the upstanding member 70 for controlling the movement of the conveyor 64 and the battery case 10 as well as the operation of the pneumatic cylinder 92.

FIGS. 2–3 and 6–7 illustrate schematically the sequence of operation of the apparatus 60 with FIGS. 2 and 3 illustrating the conveyor 64 transporting the battery case 10 which contacts and is guided by the side guide 68. The electric eye 66 senses the arrival of the battery case 10 on the conveyor 64, and signals the electrical control 140 to direct the conveyor 64 to stop movement so as to position the battery case 10 directly beneath the tool 82. Specifically, the plurality of slots 121C–125C disposed between the plurality of punches 121A–125A and the plurality of dies 121B–125B must be properly positioned to receive the intercell partitions 31–34. Since each of the intercell partitions 31–34 in an average battery is typically 1/16 of an inch, the alignment of the battery case 10 relative to the tool is extremely critical to prevent damage to either the tool 82 or the battery case 10.

Figure 6:
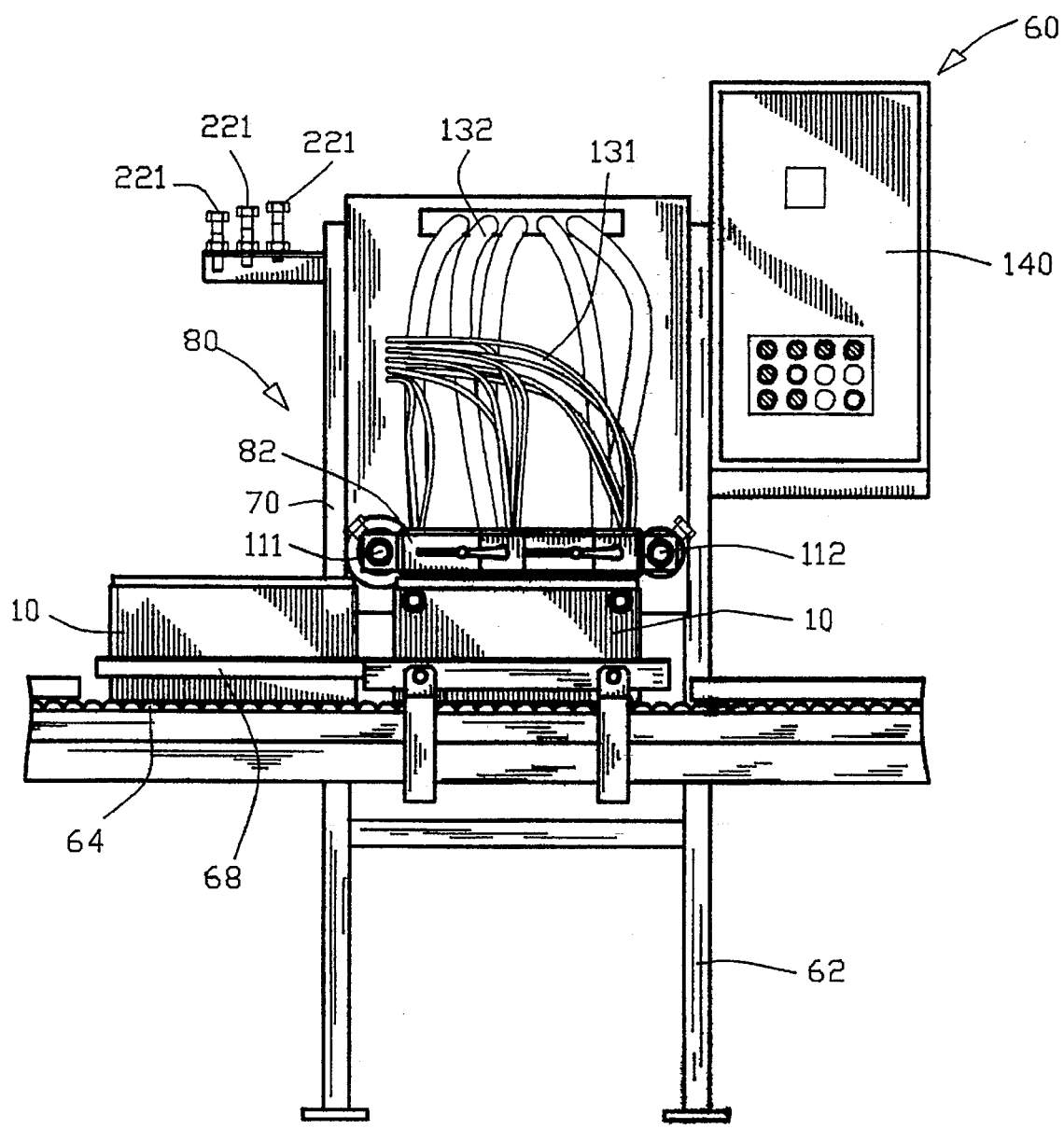
FIG. 6 is a front view of the apparatus of FIG. 2 with the movement actuator in an extended position.
Figure 7:
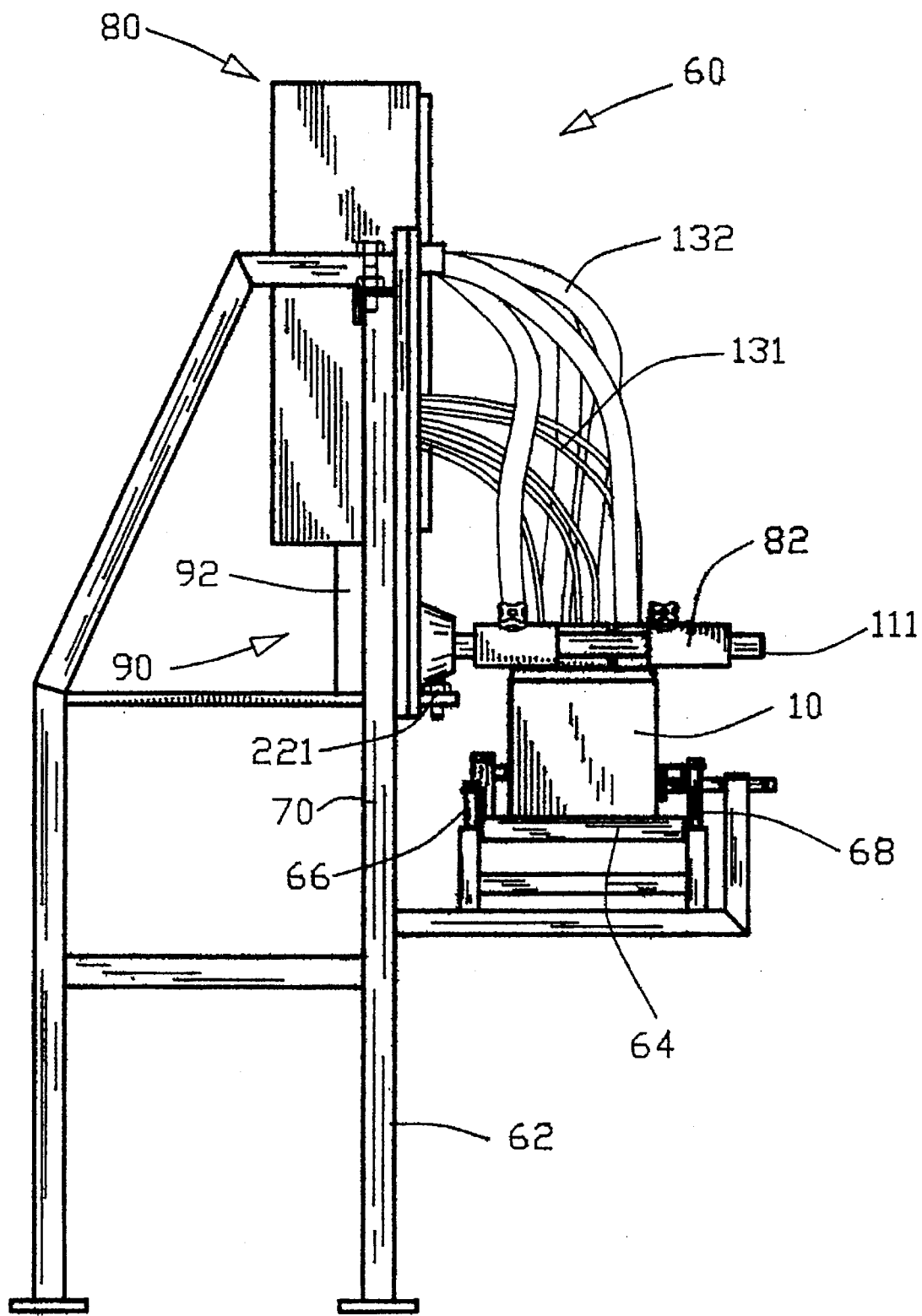
FIG. 7 is a side view of FIG. 6.

FIG. 6 and 7 illustrate the pneumatic cylinder 92 moving the tool 82 from the retracted into the extended position 92. The platen 102 is moved into the extended position whereat the slots 121C–125C properly receive the intercell partitions 31–34. In the prior art operation of such machine, the platen 102 is moved downwardly into proper position relative to the battery 10 through the pneumatic cylinder 92. Upon the proper position of the tool 82 relative to the battery case 10, the plurality of punches 121A–125A are energized to produce the intercell holes 51–55 and the severed portions of the holes 51–55 are removed by the hoses 132 through a vacuum source.

Once the plurality of punches 121–125 produce the intercell holes 51–55 the platen 102 is raised by the pneumatic cylinder 92 and the conveyor 64 transports the battery case 10 for further manufacturing processes.

Figure 8:
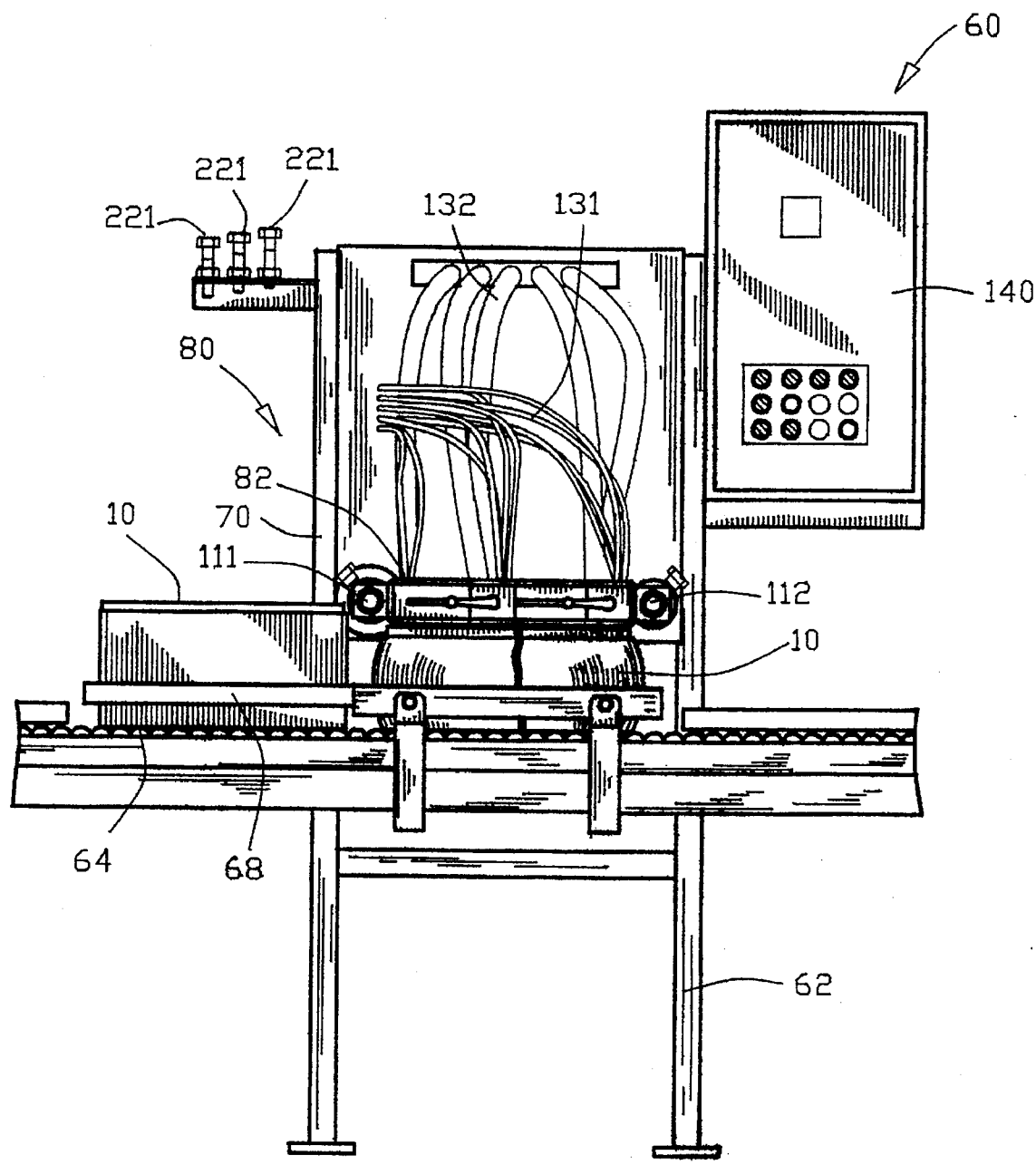
FIG. 8 is a front view of the apparatus of FIG. 2 with the movement actuator in an extended position with the battery case being in a misaligned position.

Although the apparatus 60 for punching the holes 51–55 intercell partitions 31–34 of the battery case 10 has found significant success in the past, a problem arises in the event the battery case 10 is not properly positioned relative to the tool 82. FIG. 8 illustrates the improper positioning of the battery case 10 relative to the tool 82 whereat the battery case 10 is cracked and/or one of the intercell partitions 31–34 may be completely destroyed. The destruction of the battery case 10 is caused by the tool 82 being constructed of steel whereas the battery case 10 is constructed of a polymeric material. Secondly, the battery case 10 typically suffers substantial damage due to the force provided by the air cylinder 92. A force of over 100 pounds is typically generated by the air cylinder 92 in order to properly position the tool 82 and the associated plurality of hole punches 121–125 in a proper downward position.

Figure 9:
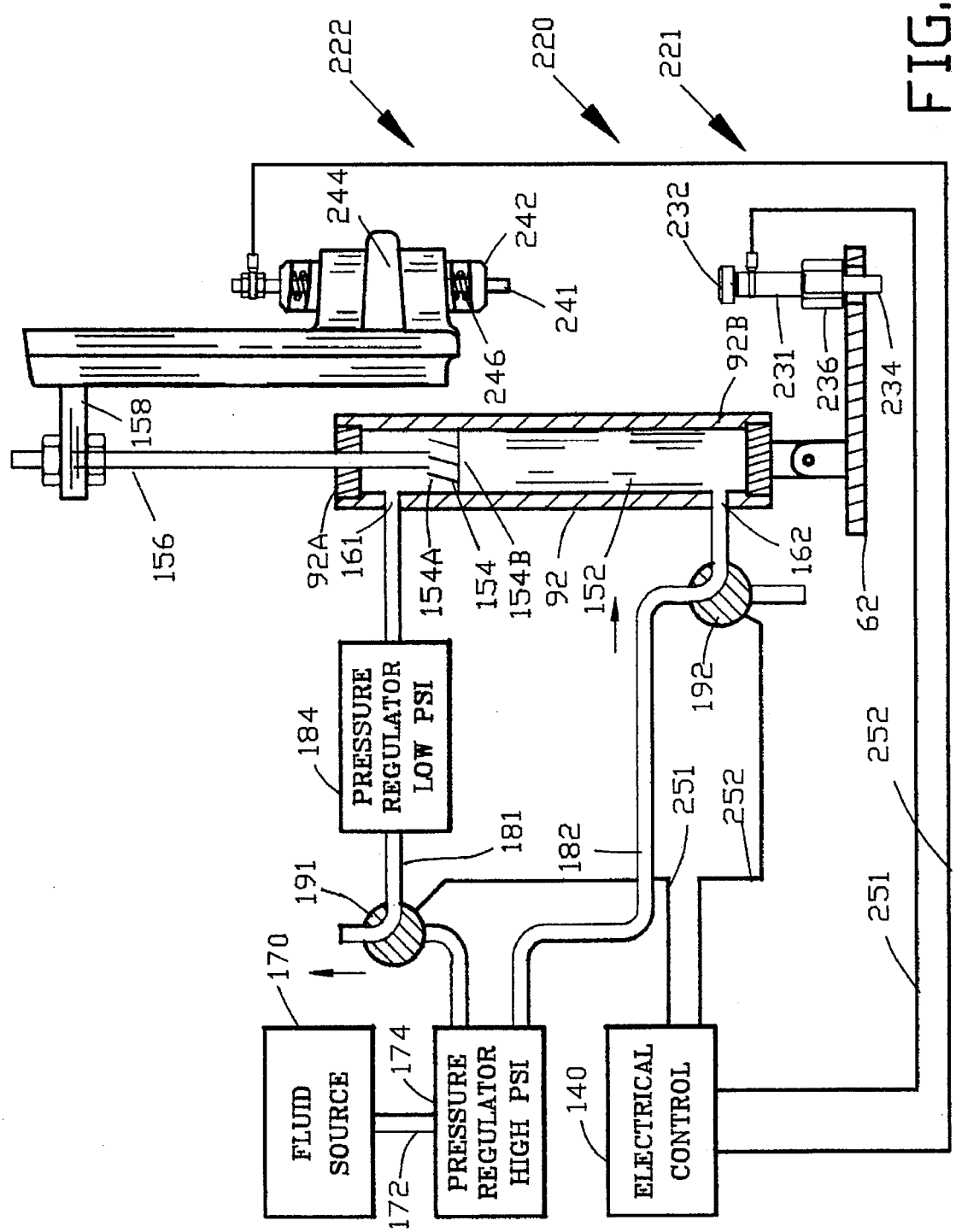
FIG. 9 is a diagram of the improved control system of the present invention with a movement actuator shown in a retracted position.

FIG. 9 is a diagram of the improved control system 150 of the present invention illustrating the actuator 80 shown in the retracted position. The pneumatic cylinder 92 has a first and a second end 92A and 92B with an internal cylinder 152 slidably receiving a piston 154 having a first and a second piston side 154A and 154B. The piston 154 is connected to an actuator shaft 156 with the actuator shaft 156 being secured to a connector 158 mounted to the platen 102. A first and a second fluid port 161 and 162 is located adjacent the first and second ends 92A and 92B of the fluid cylinder with the piston 154 being interposed between the first and second fluid ports 161 and 162. Movement of the piston 154 by air pressure within the cylinder 152 will move the member 80 from the extended to the retracted position as will be described hereinafter.

A source of compressed air 170 is connected by a conduit 172 to a first pressure regulator 174. The pressure regulator provides a constant pressure, for example 86 pounds per square inch, into a first and second conduit 181 and 182. A second pressure regulator 184 is interposed within the first conduit 181 for reducing the regulated pressure to approximately 40–60 pounds per square inch prior to entering a first fluid port 161. The second conduit 182 is connected to a second valve 192. The first and second valves 191 and 192 are electrically actuated valves and are controlled through electrical connectors 201 and 202 and the electrical control 140.

The improved control system 150 also comprises a sensor 220 for sensing a predetermined location of the member 80 between the retracted position and the extended position. The sensor 220 includes a contact base shown generally as 221 and a probe shown generally as 222 for sensing a predetermined location of the member 80 in proximity to the extended position. The contact base 221 is fixed in relation to the extended position and the probe 222 is secured relative to the movement actuator 90 to move in unison with the member 80.

The contact base 221 is shown as a threaded bolt 231 having a head 232 and a threaded shaft 234. A nut 236 threadably engages the threaded shaft 234 for adjusting the vertical height of the bolt head 232. The probe 222 comprises a probe shaft 241 slidably disposed within a casing 242 which is secured by a housing 244 to the platen 102. The probe shaft 241 is urged by a spring 246 into an extended position. Electrical connectors 251 and 252 respectively removably connect the contact base 221 and the probe shaft 222 to the electrical control 140.

FIG. 9 illustrates the opening of the second valve 192 for allowing the fluid source 170 to provide fluid under pressure to the first pressure regulator 174 and through the second conduit 182 and the second valve 192 to apply pressure to the second side 154B of the piston 154 for raising the actuator shaft 156. The motion as illustrated in FIG. 9 moves the platen 102 into the retracted position as shown in FIGS. 2 and 3.

Figure 10:
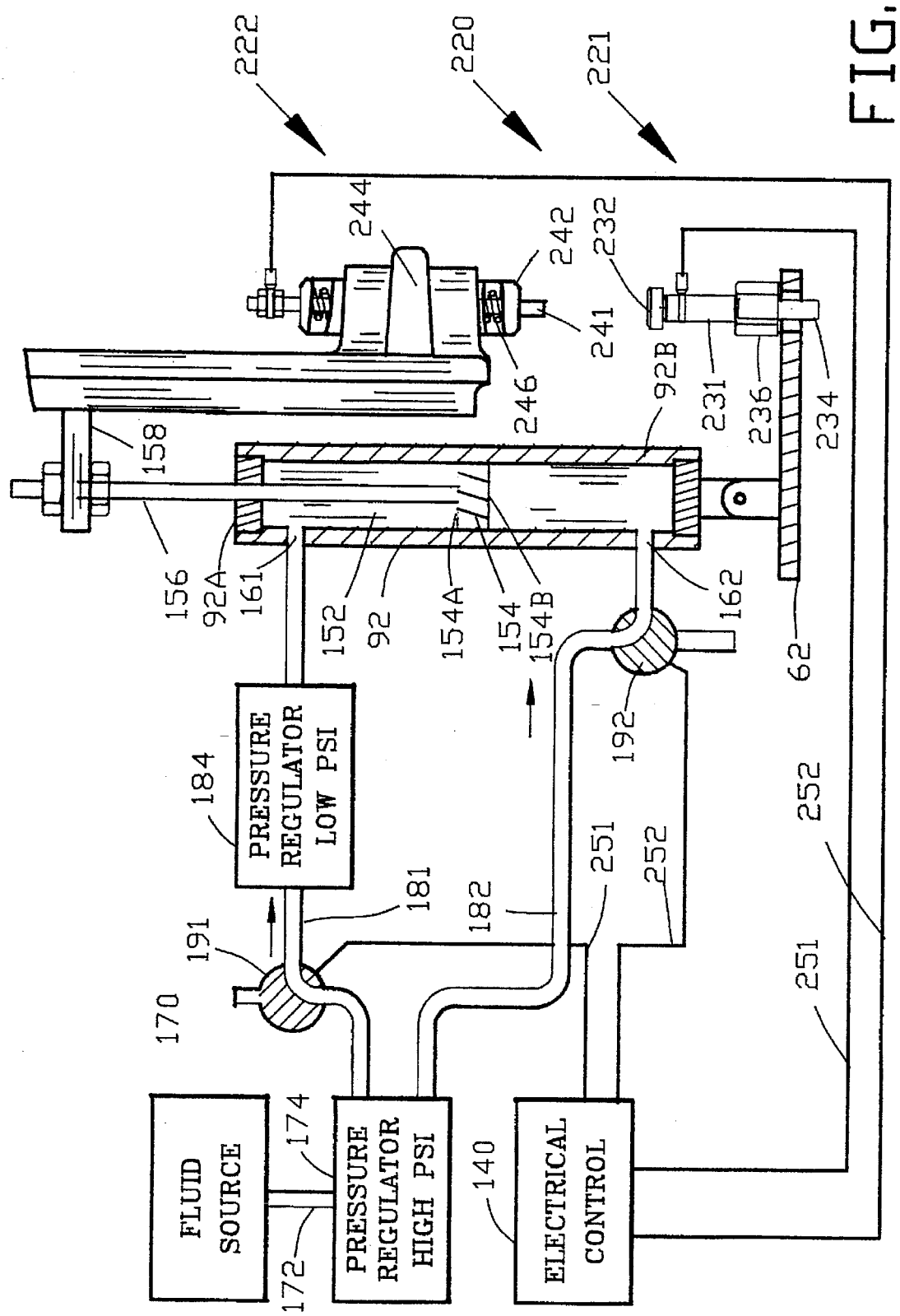
FIG. 10 is a diagram of the improved control system with the movement actuator being moved toward an extended position.

FIG. 10 illustrates the activation of the electrical control 140 sensing a battery case 10 in proper position under the tool 82 whereat the electrical control 140 move the first valve 191 into the position as shown in FIG. 10. The opened first valve 191 enables fluid pressure from pressure regulator 174 passes through the first conduit 182 to the first side 154A of the piston 154. According a fluid pressure is applied simultaneously to the first and second sides 154A and 154B of the piston 154. A low pressure fluid is applied through first conduit 181 and the first valve 191 to the first side 154A of piston 154 to provide a lower pressure within the first end 92A of the cylinder 152. A high pressure fluid is applied through second conduit 182 and the second valve 192 to the second side 154B of piston 154 to provide a higher pressure within the second end 92B of the cylinder 152. The low pressure fluid applied to the first side 154A of piston 154 and the high pressure fluid applied to the second side 154B of piston 154 produces a differential force on the piston 154.

Preferably, the second pressure regulator 184 is adjusted such that the weight of the platen 102 and the associated tool 82 combined with the differential force produced by the low pressure fluid applied to the first side 154A of piston 154 and the high pressure fluid applied to the second side 154B of piston 154 allows the platen 102 to move at a reduced force. In this embodiment, the movement of the platen 102 is in a vertical direction. However, it should be realized by those skilled in the art that the invention may be utilized for a horizontal movement of the member 80 whereat the pressure regulator 184 is not adjusted to compensate for the weight of the member 80. The reduced force inhibits any damage to either the tooling 82 or the battery case 10. Furthermore, the reduced force reduces the risk of any injury to an operator or person accidentally caught in the movement path of the tool 82.

Figure 11:
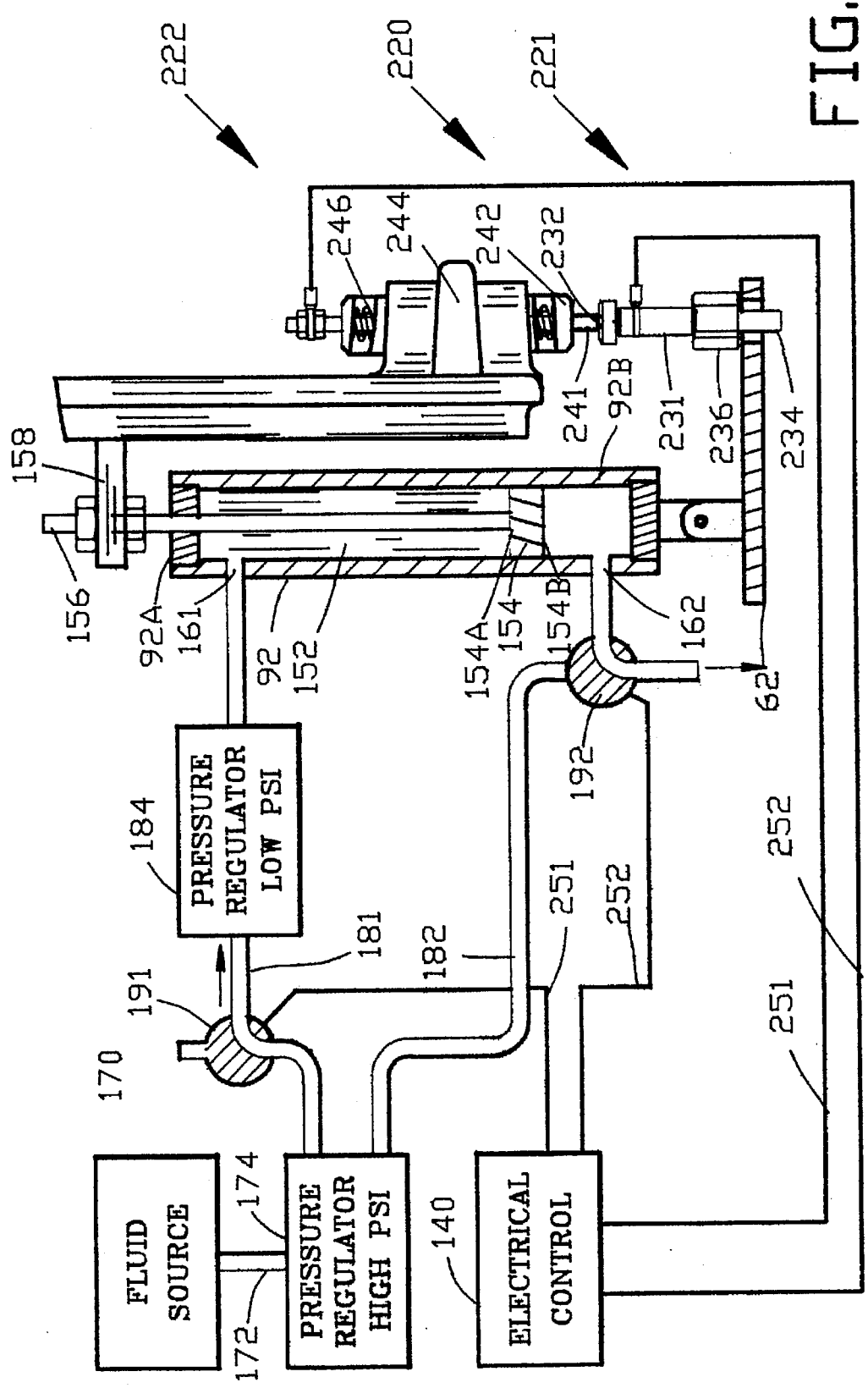
FIG. 11 is a diagram of the improved control system with the movement actuator being in proximity to the extended position.

FIG. 11 illustrates further downward movement of the platen 102 whereat the probe shaft 222 contacts the contact base 221 to provide an electrical contact between the electrical conductors 251 and 252 to the electrical controller 140. Upon the interconnection of the electrical connectors 251 and 252 by the contact base 221 and the probe shaft 222, the electrical control 140 moves the second valve 192 to a position as shown in FIG. 11 to eliminate the fluid pressure on the second side 154B of the piston 154 and to vent any fluid from the second end 92B of the cylinder 92. Accordingly, the first side 154A of the piston 154 is subjected to the full force of the fluid under pressure through the first valve 181 to move the platen 102 downwardly toward the extended position. The force of the pressure regulator 184 ensures that the platen 102 and the tool 82 is in the proper position for operation on the battery case 10.

Figure 12:
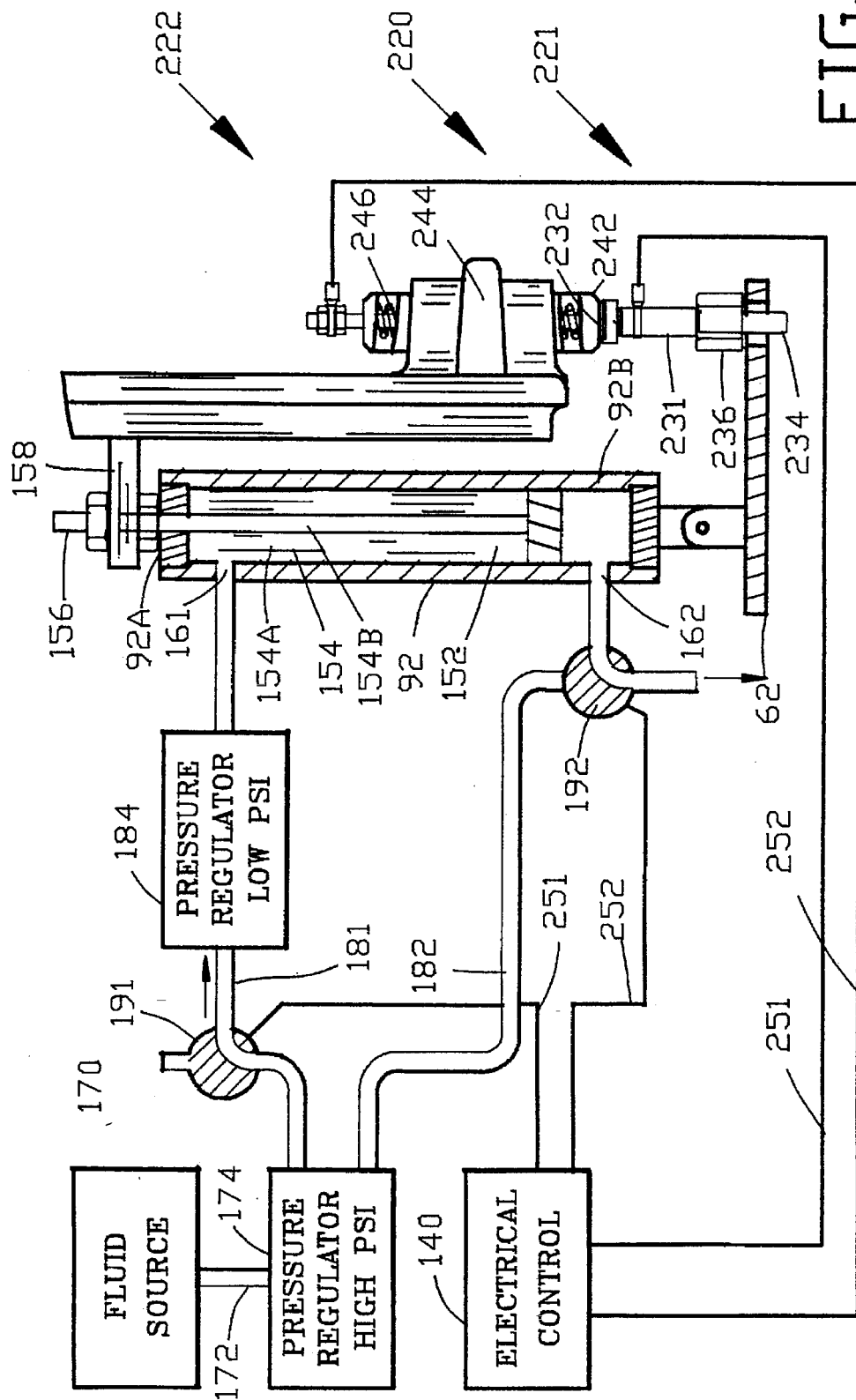
FIG. 12 is a diagram of the improved control system with the movement actuator being in the extended position.

FIG. 12 illustrates the moving of the member 80 into the extended position with the force of fluid pressure only on the first side 154A of piston 154. A contact between the casing 242 and the bolt head 232 acts as a stop for eliminating any further downward movement of the platen 102. As it can be readably seen from FIGS. 11 and 12, the platen 102 is moved in proximity to the extended position with a differential fluid pressure applied to both the first and second sides 154A and 154B of the piston 154. Upon contact of the probe shaft with the contact base 221 as shown in FIG. 11 at this predetermined location, the platen 102 is then moved into the extended position by a non-differential force of fluid only applied to the first side 154A of the piston 154. Accordingly, a differential fluid pressure is used to move the tool 82 into position relative to the battery case 10 until the tool 82 is assured of being properly aligned relative to the battery case 10. Thereafter, a non-differential force is applied to the piston 154 to ensure that the tool 82 is properly positioned relative to the battery case 10 for proper operation thereon.

Preferably, the differential pressure applied to the piston 154 after compensation of the mass of the member 80 will produce a force of approximately 10 pounds. When the predetermined location is achieved whereat a non-differential force is applied to the pistons 154, the member 80 is moved with a force in excess of 100 pounds. Preferably, the predetermined location as shown in FIG. 11 is in proximity to the extended position and preferably a 0.25 inch from the extended position as shown in FIG. 12. The 0.25 inches distance eliminates the possibility of objects being accidentally placed within the path of the member 80.

The bolt 236 allows minor adjustments of the bolt head 232 relative to the frame 62 for making fine adjustments to the predetermined location. In addition, the bolt 232 is interchangeable with other bolts of other predetermined positions for enabling one to quickly change the position of the tool 82 relative to the conveyor 62 when the apparatus 60 is used for manufacturing a different classification of battery case.

The present invention has provided a multitude of new and deskable features for the movement of a member such as a tool relative to the work piece. Although the invention has been disclosed with reference to a battery manufacturing machine and in particular to a machine for housing a battery case it should be appreciated by those skilled in the art that the present invention has universal application for all types of moveable members. Furthermore, the present invention is equally suitable for either a pneumatic or a hydraulic system. The present invention allows fast adjustment on change over for different size objects by the substitution of the bolt 232 as the contact base 221. Furthermore, precise adjustment is allowed by the rotation of the nut 236 to adjust the height of the bolt head 232. Furthermore, the height of the bolt head 232 provides not only a sensor for predetermined location of the differential change over but also provides a positive stop for the movement of the member. The present invention reduces possible damage to the apparatus or any tooling associated as well as being safe for operators or for other objects interposed in the path of the moveable member.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved control system for a movement actuator for moving a member between a retracted and an extended position, the movement actuator comprising a cylinder with a piston located therein, the piston having a first and a second side with the piston being interposed between a first and a second fluid port, and a first and a second conduit respectively interconnecting the first and second fluid ports to a fluid supply, improvement comprising:

a first pressure regulator for regulating the flow of fluid through the first conduit with a first fluid pressure;

a second pressure regulator for regulating the flow of fluid through the second conduit with a second fluid pressure;

a first and a second valve respectively interposed in the first and second fluid conduits for controlling the flow of fluid between the fluid supply and the first and second fluid ports;

a sensor for sensing a predetermined location of the member between the retracted position and the extended position;

a control for actuating the first and the second valves for respectively applying said first and second fluid pressures on said first and second sides of said piston for moving the member from the retracted position toward the extended position with a force related to a difference between said first fluid pressure and second fluid pressure; and said control actuating said first valve and deactivating said second valve for applying said first fluid pressure on the first side of said piston upon said sensor sensing the member being in said predetermined location for moving the member into the extended position with a force related to said first fluid pressure.

2. An improved control system for a movement actuator as set forth in claim 1, wherein said cylinder and said piston define an air cylinder.

3. An improved control system for a movement actuator as set forth in claim 1, wherein said cylinder has a first and a second end with the first and second fluid ports respectively located proximate to the first and second ends.

4. An improved control system for a movement actuator as set forth in claim 1, wherein said movement of the member with a controlled force inhibits damage to one of the member and an object interposed between the retracted position and the extended position.

5. An improved control system for a movement actuator as set forth in claim 1, wherein the member moves in a vertical direction between the first and the extended position;

the member having a weight providing a vertically downward force; and said first and second pressure regulators being selected for establishing said differential fluid pressure to compensate for said vertically downward force of the member in establishing said controlled force.

6. An improved control system for a movement actuator as set forth in claim 1, wherein said control actuating said first valve includes said control actuating said first valve for applying said first fluid pressure on the first side of said piston upon said sensor sensing the position of the member in close proximity to the extended position.

7. An improved control system for a movement actuator as set forth in claim 1, wherein said sensor includes a contact point and a probe;

said contact point being secured in relation to the extended position;

said probe being secured relative to said actuator for movement in unison with the member; and said probe contacting said contact point when said member is disposed in said predetermined location.

8. An improved control system for a movement actuator as set forth in claim 1, wherein said sensor includes a contact point and a probe;

said contact base being secured in relation to the extended position;

said probe being secured relative to said actuator for movement in unison with the member;

said probe contacting said contact point when said member is disposed in said predetermined location; and one of said probe and said contact point being adjustable for adjusting said predetermined location.

9. An improved control system for a movement actuator for moving a member between a first and an extended position relative to an object through the use of a fluid supply, comprising:

a cylinder having a first and a second fluid port located proximate to a first and a second end of the cylinder;

a piston having a first and a second piston side disposed within said cylinder with said piston being interposed between said first and second fluid ports;

a first and a second conduit interconnecting the fluid supply to said first and second fluid ports;

a first and a second valve respectively interposed in said first and second conduits for controlling the flow of fluid between the fluid supply and the first and second fluid ports;

a first pressure regulator for regulating the flow of fluid through the first fluid port with a first fluid pressure;

a second pressure regulator for regulating the flow of fluid through the second fluid port with a second first fluid pressure;

a sensor for sensing a predetermined location of the member in close proximity to the extended position;

a control for actuating the first and the second valves for respectively applying said first and second fluid pressures on said first and second sides of said piston for moving the member from the retracted position toward the extended position with a controlled force related to a difference between said first fluid pressure and second fluid pressure;

said controlled force inhibiting damage to one of the member and an object interposed in a path of movement of the member between the retracted position and the extended position; and said control actuating said first valve and deactuating said second valve for applying said first fluid pressure on the first side of said piston upon said sensor sensing the member being in said predetermined location for moving the member into the extended position with a force related to said first fluid pressure for insuring the proper positioning of the member in the extended position.

10. An improved control system for a movement actuator for moving a member between a first and an extended position relative to an object through the use of a fluid supply, comprising:

a cylinder having a first and a second fluid port located proximate to a first and a second end of the cylinder;

a piston having a first and a second piston side disposed within said cylinder with said piston being interposed between said first and second fluid ports;

a first and a second conduit interconnecting the fluid supply to said first and second fluid ports;

a first and a second valve respectively interposed in said first and second conduits for controlling the flow of fluid between the fluid supply and the first and second fluid ports;

a first pressure regulator for regulating the flow of fluid through the first fluid port with a first fluid pressure;

a second pressure regulator for regulating the flow of fluid through the second fluid port with a second first fluid pressure;

a sensor for sensing a predetermined location of the member in close proximity to the extended position;

a control for actuating the first and the second valves for respectively applying said first and second fluid pressures on said first and second sides of said piston for moving the member from the retracted position toward the extended position with a controlled force related to a difference between said first fluid pressure and second fluid pressure;

said controlled force inhibiting damage to one of the member and an object interposed in a path of movement of the member between the retracted position and the extended position; and said control actuating said first valve for applying said first fluid pressure on the first side of said piston upon said sensor sensing the member being in said predetermined location for moving the member into the extended position with a force related to said first fluid pressure for insuring the proper positioning of the member in the extended position.

11. An improved control system for a movement actuator as set forth in claim 10, wherein said cylinder and said piston define an air cylinder.

12. An improved control system for a movement actuator as set forth in claim 9, wherein said sensor includes a contact point and a probe;

said contact point being secured in relation to the extended position;

said probe being secured relative to said actuator for movement in unison with the member; and said probe contacting said contact point when said member is disposed in said predetermined location.

13. An improved control system for a movement actuator as set forth in claim 9, wherein said sensor includes a contact point and a probe;

said contact point being secured in relation to the extended position;

said probe being secured relative to said actuator for movement in unison with the member;

said probe contacting said contact point when said member is disposed in said predetermined location; and one of said probe and said contact point being adjustable for adjusting said predetermined location.

14. An improved control system for a movement actuator as set forth in claim 11, wherein said sensor includes a contact point and a probe;

said contact base being secured in relation to the extended position;

said probe being secured relative to said actuator for movement in unison with the member;

said probe contacting said contact point when said member is disposed in said predetermined location; and one of said probe and said contact point being adjustable for adjusting said predetermined location.

15. An improved control system for a movement actuator as set forth in claim 11, wherein said sensor includes said sensor changing an electrical circuit upon said member being disposed in said predetermined location.

16. An improved control system for a movement actuator for moving a member between a retracted position and an extended position, the movement actuator comprising a cylinder receiving a piston with the piston having a first and a second piston side, comprising:

a control for applying a first and a second fluid pressure on the first and second piston sides of said piston;

said first fluid pressure being greater than said second fluid pressure for moving the member from the retracted position toward the extended position with a force related to said first fluid pressure opposed by said second fluid pressure for reducing the possibility of damage to an unintended object in the path of the member;

a sensor for sensing a predetermined location of the member in proximity to the extended position;

means connecting said sensor to said control for applying said first fluid pressure on the first piston side of the piston opposed by a reduced second fluid pressure upon said sensor indicating the member being in proximity to the extended position for moving the member into the extended position with an increased force related to said first fluid pressure for insuring proper positioning of the member in the extended position.

17. An improved control system for a movement actuator for moving a member between a retracted position and an extended position, the movement actuator comprising a cylinder receiving a piston with the piston having a first and a second piston side, comprising:

a control for applying a first and a second fluid pressure on the first and second piston sides of said piston for moving the member from the retracted position toward the extended position with a force related to a difference between said first fluid pressure and second fluid pressure for reducing the possibility of damage to an unintended object in the path of the member;

a sensor for sensing a predetermined location of the member in proximity to the extended position;

means connecting said sensor to said control for applying only said first fluid pressure on the first piston side of the piston upon said sensor indicating the member being in proximity to the extended position for moving the member into the extended position with an increased force related to said first fluid pressure for insuring proper positioning of the member in the extended position.

* * * * *